United States Patent [19]

Hanemaayer

[11] Patent Number: 5,662,373
[45] Date of Patent: Sep. 2, 1997

[54] RECREATIONAL VEHICLE HAVING MULTIPLE USE INTERIOR FACILITIES AND SPACES

[76] Inventor: Jacobus N. Hanemaayer, 100 Shirley Avenue, Kitchener, Ontario, Canada, N2B 2E1

[21] Appl. No.: 497,280

[22] Filed: Jun. 30, 1995

Related U.S. Application Data

[63] Continuation-in-part of Ser. No. 139,502, Oct. 19, 1993.

[30] Foreign Application Priority Data

Nov. 27, 1992 [CA] Canada .................................. 2084020
Jan. 4, 1993 [CA] Canada .................................. 2086637

[51] Int. Cl.⁶ .................................................. B60P 3/32
[52] U.S. Cl. ...................... 296/164; 296/24.1; 296/25; 4/613
[58] Field of Search ..................... 296/24.1, 156, 296/164, 25; 4/608, 613

[56] References Cited

U.S. PATENT DOCUMENTS

| | | |
|---|---|---|
| 842,821 | 1/1907 | Tryon .................................. 312/205 |
| 1,663,990 | 3/1928 | Marohn ............................ 312/258 X |
| 2,483,340 | 9/1949 | Gilbert ................................ 312/258 |
| 4,253,699 | 3/1981 | Frank ................................... 296/25 |
| 4,253,715 | 3/1981 | Greiner ............................ 312/258 X |
| 4,550,946 | 11/1985 | Hanemaayer ....................... 296/156 |
| 4,572,593 | 2/1986 | Takamizawa et al. ........... 312/258 X |
| 4,579,401 | 4/1986 | Mears ................................. 312/258 |
| 4,620,741 | 11/1986 | Hanemaayer ................... 296/156 X |
| 4,685,719 | 8/1987 | Hanemaayer ................... 296/164 X |
| 4,847,972 | 7/1989 | Anderson et al. .................. 296/25 |

FOREIGN PATENT DOCUMENTS

| | | | |
|---|---|---|---|
| 841595 | 2/1939 | France ................................ 4/608 |
| 2375070 | 8/1978 | France ............................. 296/156 |
| 1199943 | 9/1965 | Germany ......................... 312/258 |
| 3938466 | 5/1991 | Germany ............................ 4/613 |
| 63474 | 2/1913 | Switzerland ..................... 312/205 |
| 10437 | 5/1919 | United Kingdom .............. 312/205 |
| 153957 | 11/1920 | United Kingdom .............. 312/258 |
| 2108382 | 5/1983 | United Kingdom ................. 4/613 |
| 2276541 | 10/1994 | United Kingdom ................. 4/613 |

OTHER PUBLICATIONS

RoadTrek, motor home brochure, undated.
Cross Country Camp Coach Co. Brochure, Rec'd Dec. 21, 1960.
Road Trek II, 1984.

*Primary Examiner*—Dennis H. Pedder
*Attorney, Agent, or Firm*—Killworth, Gottman, Hagan & Schaeff

[57] ABSTRACT

A recreational vehicle is provided which incorporates unique "space saver" features especially suitable for, but not limited to, a short or standard cargo van body, and which allows the user to enjoy amenities which up to now were available only in the extended body versions. These space saver amenities may include a normal width double bed and temporary shower stall which previously were only found in conversions of extended length van bodies. These space saver amenities, if used in a standard or extended length van body provide even more varied and substantial sleeping facilities, such as a king-size bed or twin beds.

5 Claims, 13 Drawing Sheets

RECREATIONAL VEHICLE HAVING MULTIPLE USE INTERIOR FACILITIES AND SPACES

CROSS REFERENCE TO RELATED APPLICATIONS

This is a continuation-in-part of U.S. patent application Ser. No. 08/139,502 filed Oct. 19, 1993.

BACKGROUND OF THE INVENTION

This invention relates to improvements in recreational vehicles and, in particular, to a recreational vehicle having multiple use interior facilities and spaces.

There are many types of recreational vehicles and the present invention is particularly applicable to camper van conversions which involve the conversion of a commercial cargo van. Most of these camper van conversions, officially known in the industry as Class B Recreational Vehicles, are built using extended body commercial cargo vans. However, several of the automotive manufacturers, including General Motors Corporation, make three different lengths of cargo vans, the short, standard, and extended body length, most of these having different wheel base lengths as well.

My earlier Canadian Patent No. 1,200,262 issued Feb. 4, 1986 discloses a recreational vehicle wherein the van is provided with uniquely designed movable partitions to create a central privacy area in the van interior. This is a good example of a "space saver" innovation which makes dual use of available space. Although the interior structures and lay-out described in the above-identified patent can be used in various lengths of cargo vans, the extended body length referred to above has been found to be most suitable.

In terms of convenience in driving and parking as well as in terms of overall size, weight, fuel efficiency, general appearance and purchase price, people in general like a shorter body length better than an extended body but at the same time they do not like to sacrifice the amenities and facilities which up to now have been provided only in the extended body version.

SUMMARY OF THE INVENTION

It is an object of the present invention to provide a recreational vehicle of the general type indicated above which incorporates unique "space saver" features especially suitable for but not limited to a short or standard cargo van body, and which allows the user to enjoy amenities which up to now were available only in the extended body versions.

It is a further object of the invention to provide space saver amenities in a shorter van body, such as a temporary shower stall which previously were generally only found in conversions of extended length van bodies and which space saver amenities, if used in a standard or extended length van body provide even more varied and substantial sleeping facilities, such as a lengthwise extending king-size bed or twin beds.

Accordingly, one embodiment of the invention provides a recreational vehicle (R.V.) including a body defining opposed side walls and a floor and having a plurality of serially arranged lengthwise extending sections. These sections include:

(a) a frontal section for a driver and at least one passenger;

(b) an intermediate section including at least toilet and kitchen facilities and a further facility such as a wardrobe;

(c) a rear section which is preferably convertible from (i) a sitting mode to (ii) a sleeping mode wherein a bed is (or twin beds are) provided at a selected level above the floor of the body.

The intermediate section typically has the kitchen facility located adjacent one side wall of the vehicle body, and said toilet facility and said further facility located adjacent the opposing side wall of the body, with a lengthwise extending aisle space separating said kitchen from the toilet and further facility.

In accordance with one feature of the invention the body floor, in said aisle space in the intermediate section, has a dropped floor portion having a shower pan defined therein having a drain opening, and a track extending above the aisle space for supporting a shower curtain such as to surround a person standing in the shower pan. Suitable means providing for storage of the shower curtain in either the wardrobe chamber or the toilet chamber are provided.

The intermediate section of the vehicle body preferably has transversely extending partitions on opposing sides of said aisle space associated with and defining boundaries between said facilities in said intermediate section and said rear section. These partitions each include a partition panel movable from (i) a first rearward position corresponding to a first lengthwise dimension of the rear section sufficient to at least accommodate the sitting mode to (ii) a second forwardly disposed position wherein said dimension of the rear section in the lengthwise direction is effectively increased in the vicinity of the level of the bed(s) in the sleeping mode as to accommodate a bed (or beds) of dimension greater than said first lengthwise dimension while at the same time the lengthwise dimension of the intermediate section at that level is correspondingly decreased.

The bed "dimension" being referred to may apply to the width and/or the length of the bed(s). When applied to width, the bed may extend transversely and may be for example of a "double" or "king size" width. When applied to length, the bed may be a lengthwise extending king size bed or, alternatively, a set of twin beds, spaced apart and extending lengthwise of the body.

The partition panels may be movable in several ways i.e., they may be slidable between the rearward and forward positions or they may be pivotally mounted, at least in part to provide for movement between said rearward and forward positions.

The above-noted further facility preferably comprises a storage facility and, in said intermediate section, said toilet facility is disposed forwardly of said storage facility, with said partition panels being located in said storage facility and in said kitchen facility when in said second forwardly disposed position.

The storage facility preferably comprises a wardrobe chamber for the hanging of clothing, and said partition panels, when advanced forwardly, effectively extending said rear section into lower parts of the wardrobe chamber and the kitchen facility and converting same into space sufficient to allow a bed of selected dimension to be assembled and used in said rear section to convert same to the sleeping mode.

The toilet facility preferably includes a toilet chamber having a toilet in a lower portion of same and a support panel above said toilet and swingable from a position adjacent the side wall of the body to a position for supporting lower parts of hanging garments which have been displaced into the toilet chamber clear of the toilet when said partition panels are in said second forwardly disposed position. Suitable means are provided for retaining said support panel in the garment supporting position. Securements for retaining said partition panels in either of said first or second positions are also provided.

The kitchen facility typically includes a counter area having a range, sink and work surface, a refrigerator located below the counter area in a forward portion thereof and an open space below the rearward portion of the counter area which is associated with a cabinet door or drawers to be described hereafter. The said partition panel associated with the kitchen facility can thus enter fully into and reside in said open space when in the forwardly disposed position to provide space for assembly of the double bed, twin bed or king-size bed.

The R.V. also typically includes a pair of bed/seat support structures in the rear section and fixed to the floor of the body in spaced relation adjacent opposite sides of said body. These support structures each preferably include a horizontal panel slidable in a fore and aft direction; with each said partition panel being fixed to a respective one of said horizontal panels generally normal thereto for movement therewith between said first and second positions. Alternatively, and as noted above, certain of the partition panels may be hingedly mounted for movement between the positions noted previously.

The kitchen facility may include a cabinet door for covering that face of the open space facing inwardly of said aisle, said cabinet door being hinged to that partition panel which is associated with the kitchen facility and being pivotable into parallelism with said last mentioned partition panel to permit said movement into said second forwardly disposed position. Alternatively the open space may be occupied by conventional pull-out drawers which are removed and placed under or between the beds depending on the bed configuration being made up.

In a typical embodiment that partition panel associated with the wardrobe chamber has a partition panel extension connected to an upper end thereof and being pivotable relative thereto to maintain a barrier between the rear section of the body and the Wardrobe chamber as the partition panel is moved between its rearward and forward positions.

The toilet facility preferably has a first foldable door facing said aisle which, when closed, conceals the toilet and which, when opened, can be extended across said aisle to provide a privacy barrier between said frontal section and said intermediate section. In a modified arrangement a single bi-fold door may be used to close off both the toilet chamber and the wardrobe chamber while providing the privacy barrier between the frontal and intermediate sections when opened.

The wardrobe chamber may have a second foldable door which, when closed, covers the face of the chamber and when opened can be extended across the aisle to provide a privacy barrier between said intermediate section and said rear section. This second foldable door may be a double bi-fold door hinged about both horizontal and vertical axes to permit a lower portion of the door to be pivoted up and brought into juxtaposition with the upper half thereof thereby to make room for the bed when said partition panel is moved into the lower part of the wardrobe chamber.

Numerous other features of the invention will become apparent from the detailed description which follows.

BRIEF DESCRIPTION OF THE VIEWS OF DRAWINGS

DETAILED DESCRIPTION OF THE PREFERRED EMBODIMENTS

Figure 1:
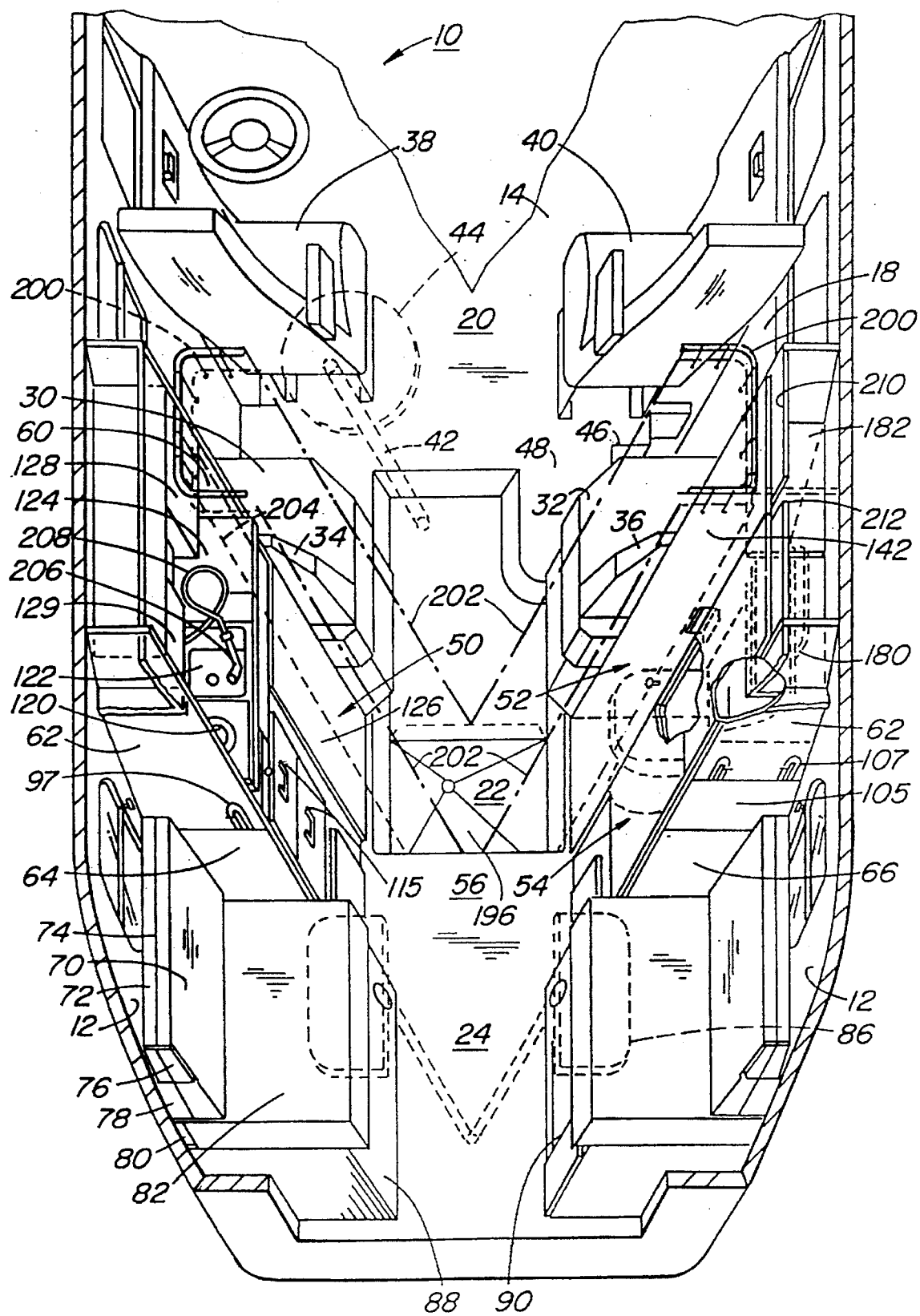
FIG. 1 is a centre split perspective view as seen from above and looking toward and into the interior of a recreational vehicle employing the principles of the present invention and with such vehicle in the driving mode with a "dinette"/sitting arrangement in the rear section. (The R.V. employs a "standard" length van body.)

With reference to the drawings it will be firstly noted that the several perspective views have been referred to as "split" perspectives. In an effort to show the various features of the invention clearly, the perspectives show the degree of divergence from bottom to top on opposite sides of the centre line as being much greater than normal and therefore components which extend across the longitudinal centre line are shown as split or broken apart as, for example, the rear dinette table shown in phantom in FIG. 1 the bi-fold doors in FIG. 2 and also the double bed configuration illustrated in FIG. 4 (by way of example only).

Reference was made above to the fact that automotive manufacturers generally make three different lengths of cargo van namely, the short, standard and extended body version. By way of example only, the General Motors Corporation (GMC) short van body has an overall length of about 178 inches and a wheel base of about 110 inches. The GMC standard cargo body has a length of about 202 inches and a wheel base of about 125 inches while the GMC extended van body has an overall length of about 223 inches and a wheel base length of about 146 inches. The instant invention may of course be utilized with cargo vans made by other manufacturers such as Ford, Chrysler and others which all vary in length and wheel base and the above examples are illustrative only and not limiting on the scope of the invention.

Again, with reference to any of FIGS. 1–8, there is shown a recreational vehicle 10 including a body 12 defining opposed side walls 12, a floor 14, a raised roof, a rear including the usual rear doors and a sliding cargo van side door (not shown) or alternatively, a pair of swing doors 18 as shown in FIGS. 1, 5, 10 and 13. The front of the van is not and need not be shown as it is entirely conventional.

The van body 12 includes several serially arranged lengthwise extending interior sections. These sections comprise a frontal section 20 for a driver and passengers and which contains seats to be described more fully hereafter. Also provided is an intermediate section 22, including at least toilet, kitchen and storage (e.g. wardrobe) facilities and a rear section 24 which is convertible from a sitting/dining mode to a sleeping mode. In the sleeping mode there is provided or made up a bed (or beds) at a selected level above the floor of the van body which bed (or beds) may assume several different forms as described hereafter.

In further detail, the frontal section 20 includes passenger lounge seats 30 and 32 with respective backrests 34 and 36. Also included are the forwardly disposed driver's seat 38 and the front passenger seat 40. The front seats 38 and 40 are mounted in known fashion for rotation about vertical axes so that these front seats can be pivoted around 180° to face the respective lounge seats 30 and 32. The backrests 34 and 36 can then be removed and the seat pairs 30, 38 and 32, 40 can be arranged with their associated seat backs to form a pair of single beds in the frontal section 20. Since this technology is known in the art generally, it need not be described further here.

It might also be noted here that the leg 42 of the round table 44 is offset from the centre of the table top and offset from the floor centre line so that when it is rotated the table top can either be located generally in the centre of the four seats 30, 32, 38 and 40 described above or off-centre to allow for good access from the intermediate section of the van body to the driver's seat 38 and the passenger's seat The previously noted side entrance doors 18 are directly behind the passenger's seat 40. A side entrance step 46 (which is deeper in the horizontal direction than that made by the original automotive manufacturer) is provided by cutting into the floor 14 in generally known fashion. The lost foot room in front of lounge seat 32 is regained there by narrowing the centrally located sunken floor (to be described fully hereafter) in the region of that floor area disposed in front of lounge seat 32 and designated by reference number 48.

The intermediate section 22 and the rear section 24 will be now described in very general terms with detailed descriptions of both to follow thereafter. Thus, in general, the intermediate section 22 has a kitchen facility 50 located adjacent the one side wall 12 of the vehicle body. A toilet facility 52 and a storage facility in the form of a wardrobe chamber 54 are located adjacent the opposing side wall 12 of the body. A lengthwise extending aisle space 56 separates the kitchen facility 50 from the toilet facility 52 and storage facility 54 respectively. The intermediate section 22 is provided with transversely extending fore and aft fixed partitions 60, 62 respectively disposed on opposing sides of the aisle space 56 with these partitions being both associated with and defining boundaries between the above-noted facilities in the intermediate section 22 and the frontal section 20 and also between these same facilities in the intermediate section 22 and the rear section 24. In particular, the aft partitions 62 each include a movable partition panel. The partition panel on the kitchen side is designated by reference number 64 while the partition panel on the opposite side is designated by reference number 66. These partition panels 64 and 66 are movable forwardly from a first rearward position corresponding to a lengthwise dimension of the rear section 24 which, in the FIG. 1 version, approximates a wide single bed width (or narrow double bed for children or small people), to a second forwardly disposed position (shown in FIGS. 3 and 4 for example), wherein the lengthwise dimension of the rear section 24 is effectively increased in the vicinity of the level of the transversely extending bed (see FIG. 4), as to approximate and accommodate a full double width bed while at the same time the lengthwise dimension of the intermediate section 22 at that general level is correspondingly decreased. It should of course be appreciated here that the terms single bed and double bed are used for illustrative purposes only and are not limiting since, under certain circumstances, the single bed width may be narrower or wider than the industry standard for single bed widths and also, in the case of the double bed width, the width actually chosen may be somewhat greater or smaller than the industry standard for double beds. In fact, in embodiments to be described hereinafter, arrangements are provided enabling a much greater than double width bed (e.g. a king size bed extending transversely or lengthwise) to be installed or made up in the rear section or alternatively, for lengthwise extending twin beds to be installed.

Referring to FIG. 1, the rear section 24 is shown as set up in the dinette mode for daily living. The back rest cushions 70 have an extension cushion 72 connected thereto by a piano hinge 74, which extension 72 is flipped over for storing when in the dinette position. The extension cushion 72 has support blocks 76 fastened to its back at both ends in order to keep the extension cushions 72 at the same upper level when in the bed position. When in the dinette mode, the back rest cushion 70 folds in between the support blocks 76. There are two short cushions 78 stored under extension cushion 72. These short cushions 78 are used for the four corners of the double bed (see FIG. 4) and have hinged support blocks 80 along one edge of the back which fold under in order to bring the top even with the tops of the adjoining back rest cushions 70 and seat cushions 82 when in the double bed configuration. When the short cushions 78 are stowed, the hinged support blocks 80 are lodged behind the seat cushions 82. The back rest cushions 70 have a fixed support block 84 (see FIG. 4) along the bottom of one side in order to keep the cushion top level with the adjoining seat cushion 82 when in the bed position. The rear dinette table 86 is removable and the table top is used to support the cushions by spanning the centre aisle between the seat bases 88 and 90 as shown for example in FIG. 7. In order to show the structural configuration of the rear dinette seat bases 88 and 90, all the seat cushions 70, 72, 78 and 82 have been removed in FIG. 2. The seat bases 88 and 90 comprise sturdy box-like structures having vertical side walls securely attached to the adjacent portions of the vehicle body and to each other by suitable fasteners (not shown). The seat bases 88 and 90 are provided with horizontally positioned panels 92 and 94 respectively disposed at the tops of the seat bases 88 and 90 and each panel being constrained for movement in a forward and rearward direction by running in U-shaped tracks or channels 96 extending along the exterior walls 12 of the vehicle body and also in oppositely disposed U-shaped tracks or channels 98 extending along the seat base panels 100 and 102 respectively. These seat base panels 100 and 102 extend forwardly and under the space defined by the wardrobe chamber 54 and into and under part of the space or region defined by kitchen facility 50.

Figure 2:
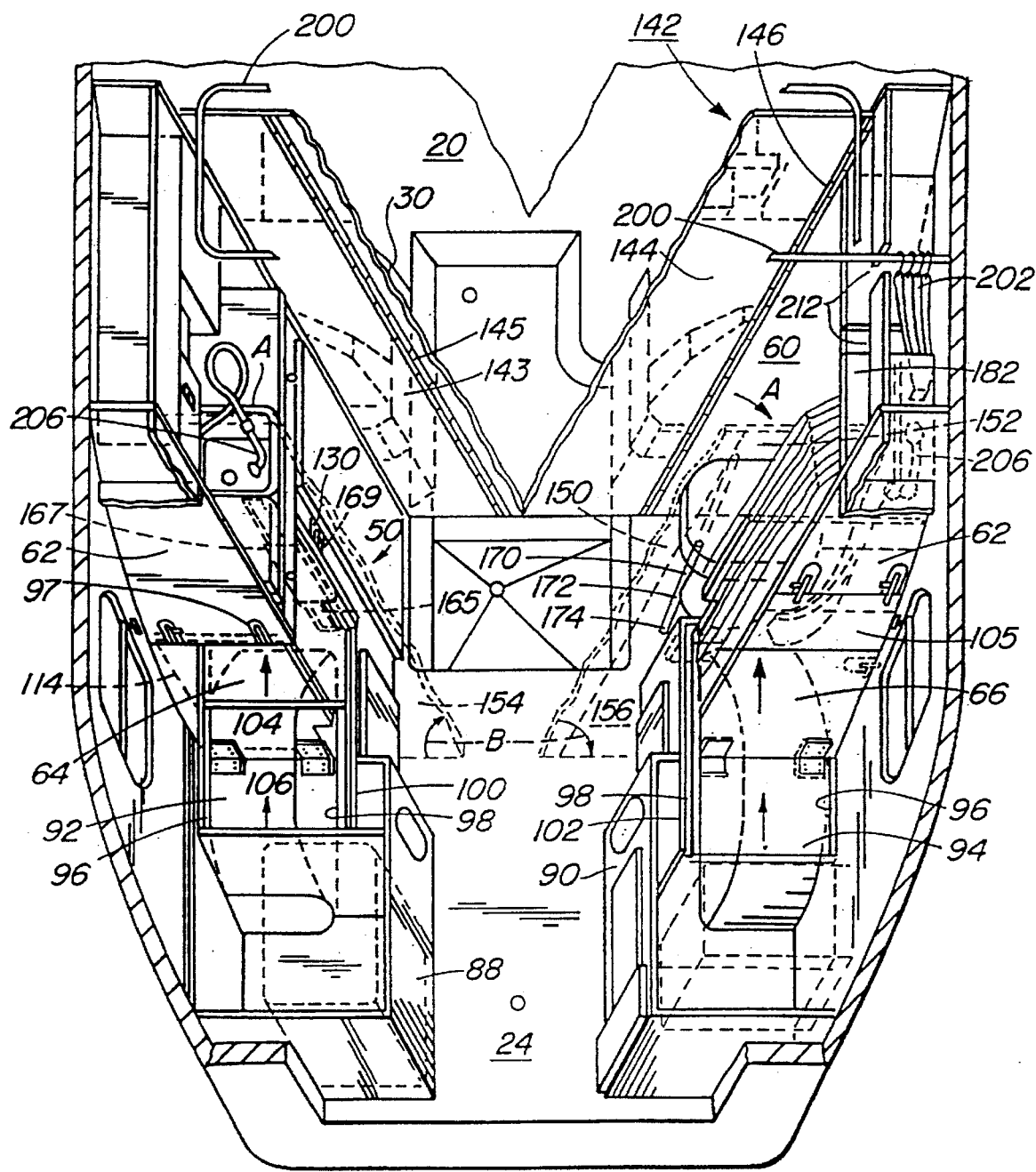
FIG. 2 is a perspective view generally similar to that of FIG. 1 and with the bi-fold door for the toilet facility being in the open position and extending across the centre aisle and with the double bi-fold door for the wardrobe chamber being shown also in the extended position in phantom. (The cushions in the rear dinette area are removed to show the details of the seat bases.)

The above-described horizontally disposed sliding panels 92 and 94 at the top of the seat bases 88 and 90 are connected firmly on a 90° angle to the previously described partition panels 64 and 66 respectively. In order to provide a firm connection, FIG. 2 illustrates metal angle plates 104 and 106 having the horizontal panels 92, 94 and partition panels 64 and 66 respectively sandwiched between them and suitably secured by means of spaced apart fasteners. This arrangement avoids the use of braces or downwardly extending extensions and permits the spaces beneath the sliding panels 92, 94 to be used for storage and the like. These metal angles 104, 106 are not shown on any of the other Figures for purposes of convenience but it is understood that they are present in all embodiments. Barrel bolts 93, 95 on lower edges of partition panels 64, 66 respectively help to retain these panels in the rearward and forward positions. These are only shown in FIG. 3 but are present in all embodiments. Further barrel bolts 97 on fixed partition 62 help secure partition 64 in the rearward position along with barrel bolt 99 on the inside of partition panel 66.

Figure 3:
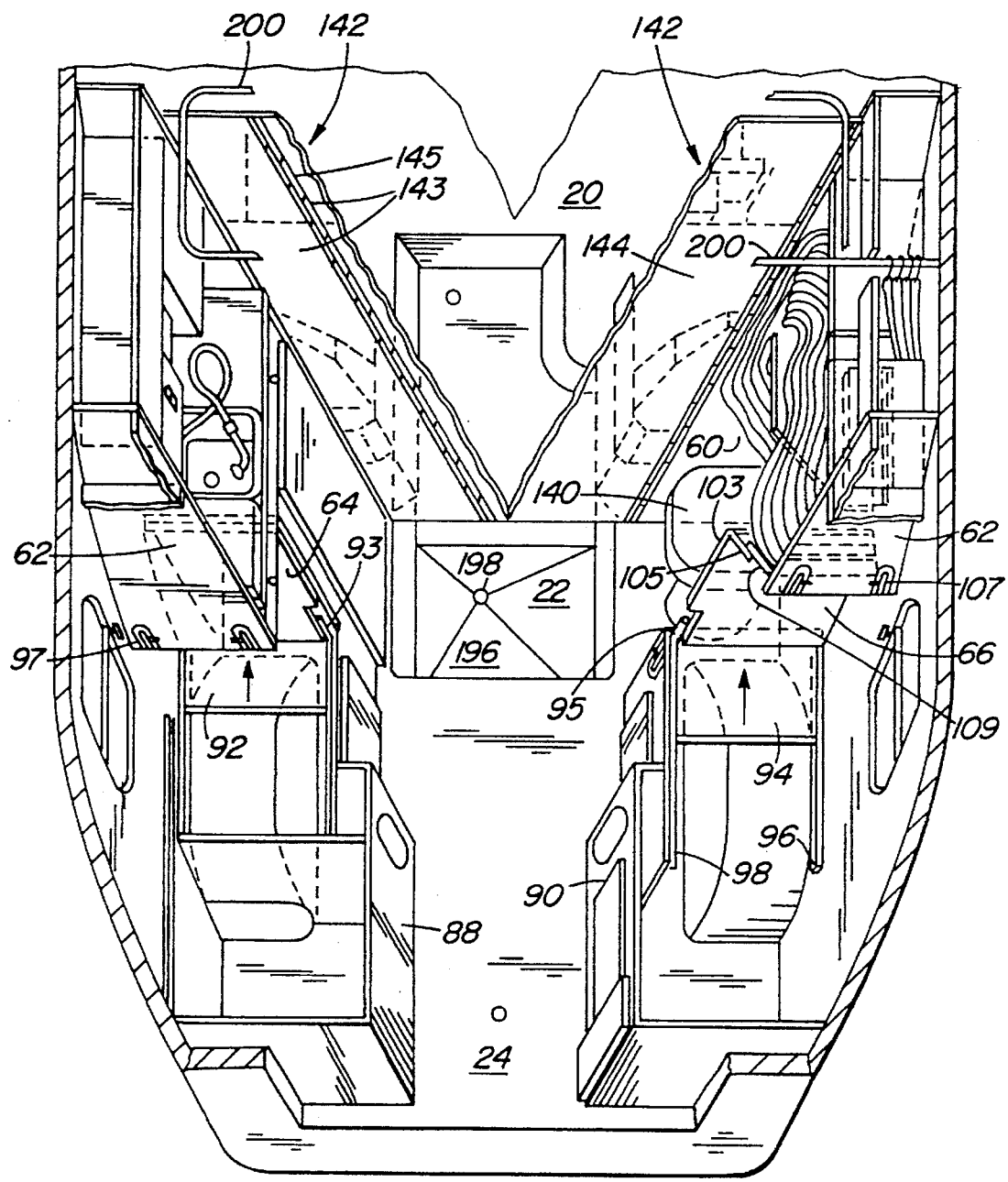
FIG. 3 is a perspective view, again generally similar to FIGS. 1 and 2, but with the partition panels and associated structures shown in their advanced positions thereby to make room in the rear section of the van for a double bed arrangement.

The two barrel bolts 93 and 95 shown on FIGS. 2 and 3 are preferably recessed into the thickness of partition panels 64 and 66 and sandwiched between angle plates 104 and 106. The flat bases of the barrel bolts are bent together until the two sides touch one another and then sealed in a groove in the recess of each of panels 64 and 66, which groove extends in between the angle plates 104 and 106. A bolt is then inserted in a hole that is drilled through the two angle plates and the bent hinge base. The barrel bolts would interfere with the cushions if installed on the surface of panels 64 and 66. They can not be installed on the other side of panels 64 and 66 because they would not be accessible due to door 114 and/or drawers 115 on the kitchen side. On the toilet side it would interfere with bi-fold door panel 144 as it would have to be near the edge of panel 66 when in the rearward position.

Figure 4:
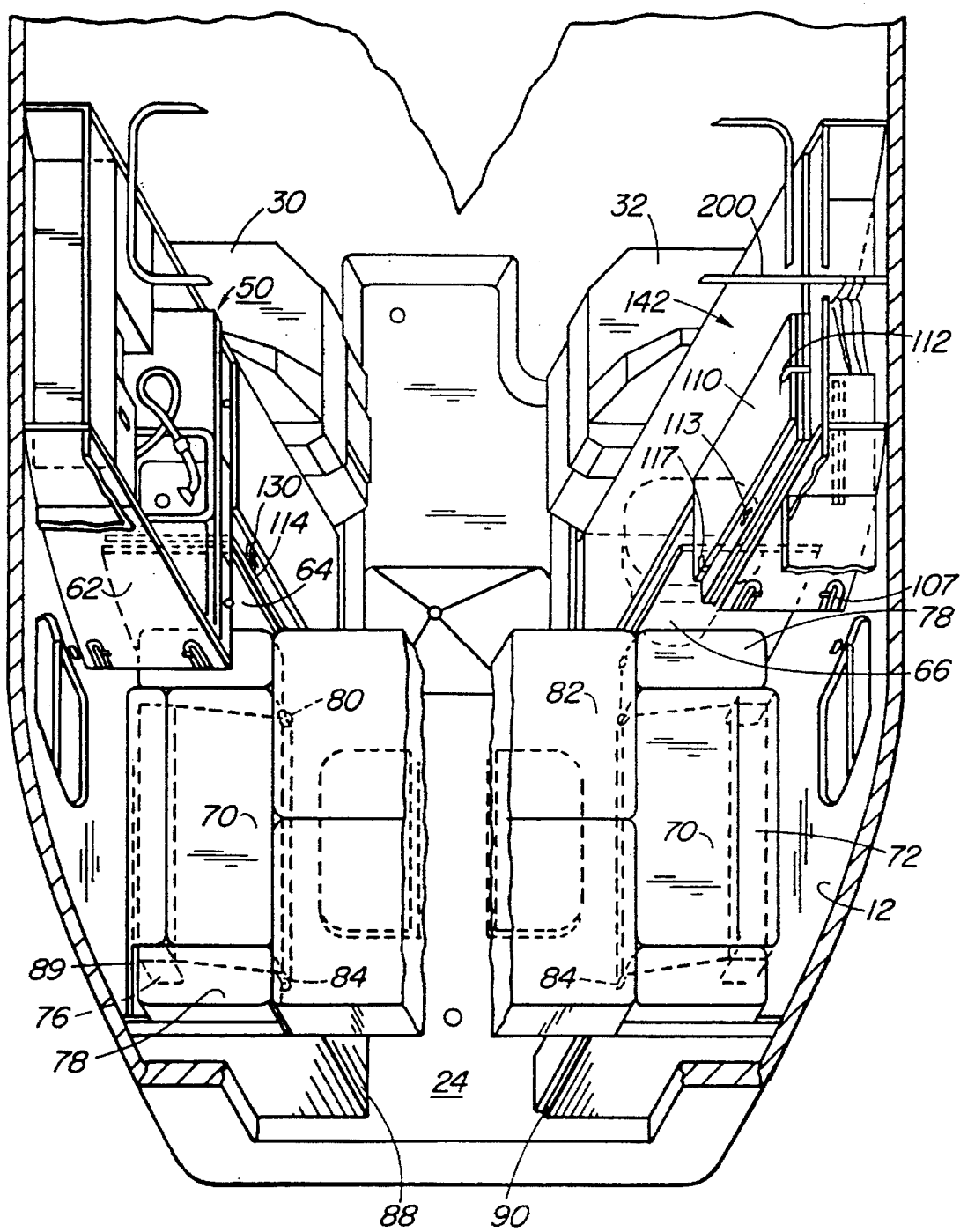
FIG. 4 is a perspective view generally similar to FIG. 3 but with the cushions of the sitting/dinette facility being rearranged and converted into a normal width double bed.
Figure 5:
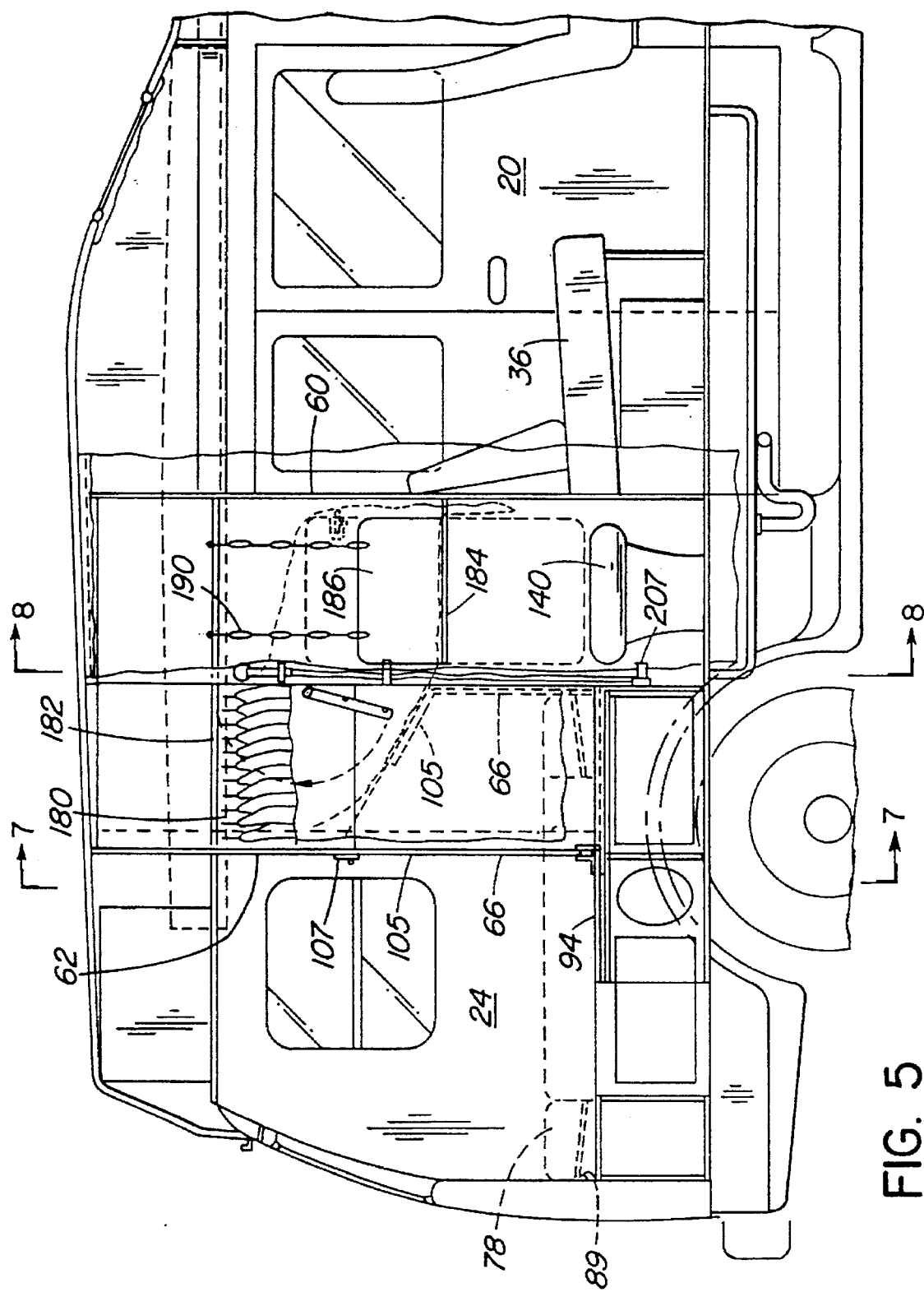
FIG. 5 is a longitudinal section view of the recreational vehicle taken along section line 5—5 of FIG. 7.
Figure 6:
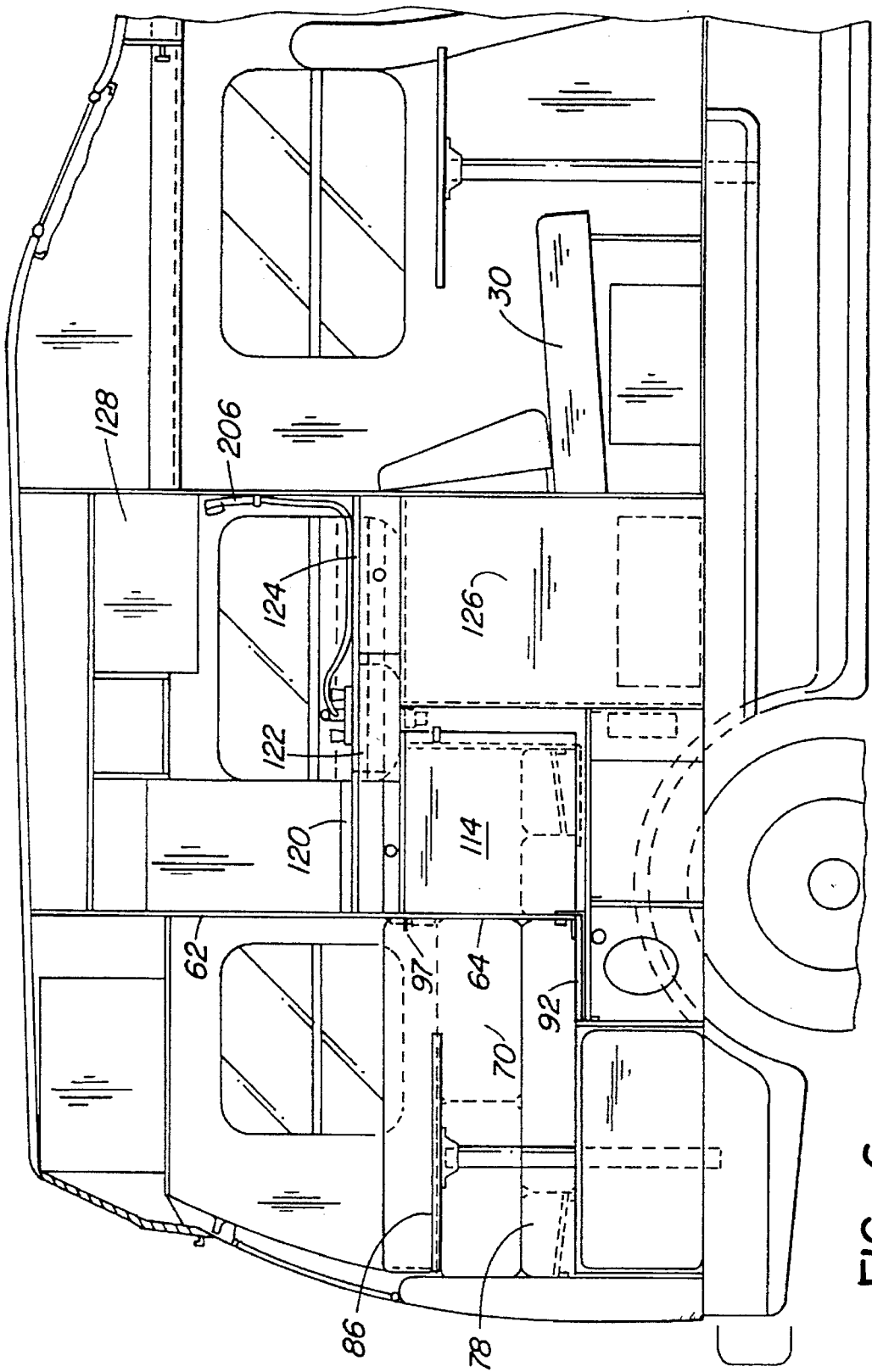
FIG. 6 is a further longitudinal section view taken along section line 6—6 of FIG. 7.
Figure 7:
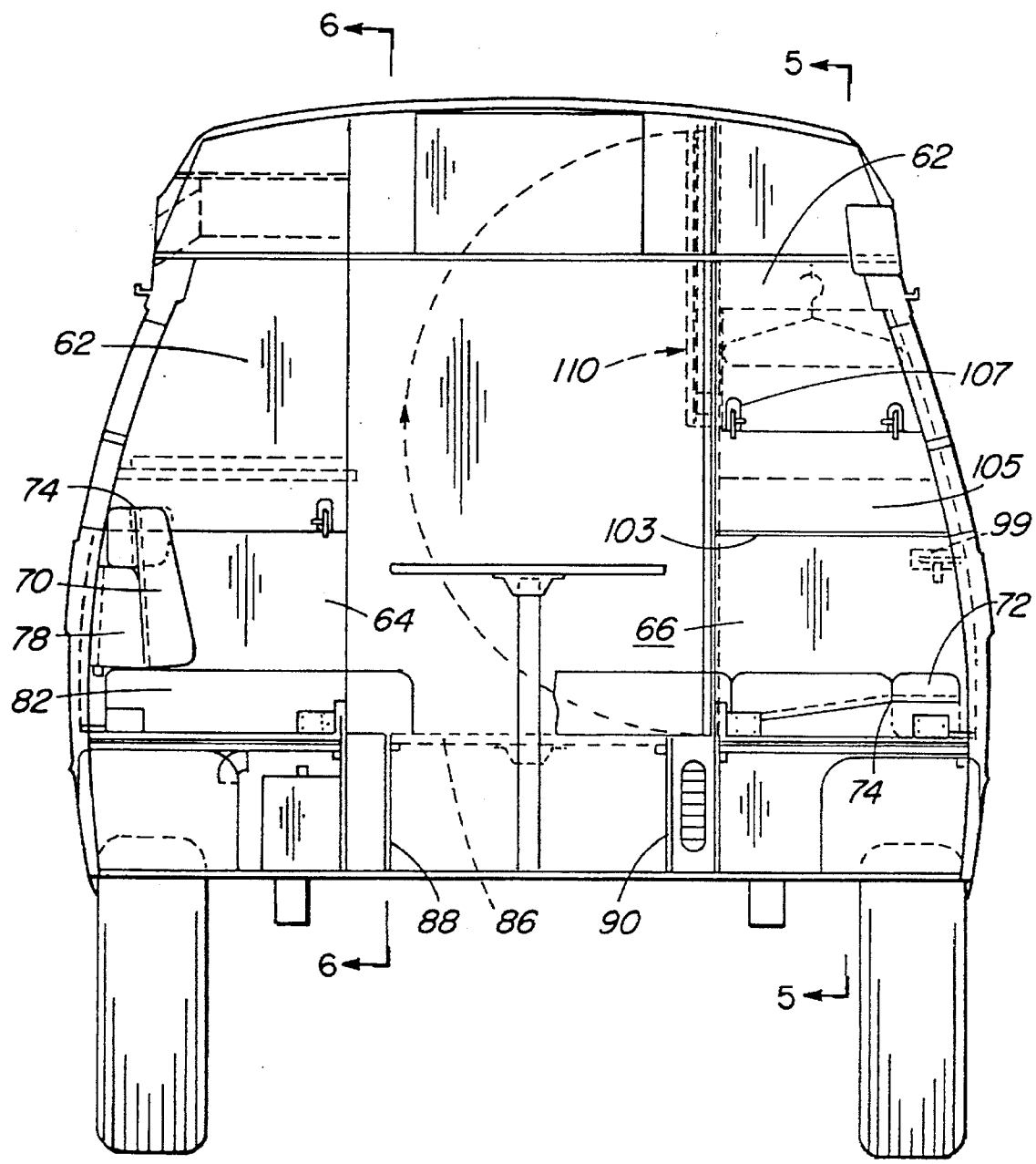
FIG. 7 is a transverse cross-sectional view at the rear of the recreational vehicle taken along line 7—7 of FIG. 5.

With reference to the forwardly movable partition panel 66, it will be noted that the upper edge of this panel is connected by a piano hinge 103 to a hinged partition panel extension 105, which panel extension, 105 is releasably secured in coplanar relation with the fixed rear partition 62 by means of barrel bolts 107. A further partition panel extension 109 partially overlies and is fixed to the hinged panel extension 105 on the inside and extends along the inside surface of the fixed rear partition 62 to within a short distance of the bottom of a horizontally disposed overhead shelf located in the wardrobe chamber. In order to limit the downward movement of the upper end of the extension 109 to a selected height, a pair of small chains 111 (shown in phantom in FIGS. 3 and 13) are fastened to the upper edge of extension 109 and to the above-noted overhead shelf. Hence, when partition panel 66 is to be moved forwardly as described previously, the barrel bolts 95 and 107 are released, and the hinged partition panel extension 105 rotates relative to partition panel 66 about the piano hinge 103 while at the same time the further panel extension 109 slides relative to the inside surface of rear partition 62 until the final position as illustrated in FIGS. 3, 4 and 5 is reached with the panel extension 109 being supported by chains 111. This movable partition panel assembly provides a barrier between the interior of the wardrobe chamber 54 and the extended space provided when converted into a double bed sleeping facility (or the king-size or twin bed arrangements to be described hereafter).

FIG. 4 illustrates the double bed lay-out when the partition panels 64 and 66 have been moved to their forward locations. The forward positioning of the partition panels 64 and 66 to locations within the kitchen facility 50 and the wardrobe chamber 54 has created sufficient space to allow a normal width double bed to be made up. Before forward movement of the partition panels 64,66 is effected, the bottom half of a double bi-fold door 110 overlying the wardrobe chamber 54 (to be described hereinafter) is swung upwardly and retained by a latch 112 or a wing bolt 113 and a cabinet door, 114 below the kitchen cooking range is swung inwardly. As an alternative to the cabinet door 114, a set of drawers 115 (FIG. 1) may be provided in this space, which drawers are removed and stored in the open space created under the bed when set up. Also, the forward movement of the partition panel 66 and associated structures causes the bottom half of garments which are hanging in the wardrobe chamber 54 to be pushed over the toilet as illustrated in FIG. 3 and which will be described more fully hereinafter.

Referring again to the double width bed, it will be seen that all of the cushions which were used to make up the dinette seating arrangement have been utilized with none left over to store which is a significant feature. The head end of the bed is on the same side of the van body as are the toilet and storage (wardrobe) facilities 52, 54 as the partition panels are arranged here to allow extra head room for a sleeper. At the opposite end, the movable partitions associated with the kitchen facility 50 do not require as much height in order to accommodate an adult's feet.

It might be noted here that the several cushions are provided with a suitable rigid backing made of wood or other suitable rigid panel material, with the cushion body being made of foam of suitable density and covered with any suitable fabric material. When in the bed configuration shown in FIG. 4, the two centre (seat) cushions 82 are of full thickness. All of the other cushions are tapered to some degree toward the ends and sides. This is done to save space when the cushions are in the dinette position as illustrated in FIG. 1 (and eliminates the need for storing of cushions). It might be noted that a bed mattress does not need to be of full thickness near the edges and ends as body weight is primarily concentrated in the central area of the mattress. An adult's feet are not heavy and the head is in any event cushioned by a pillow. The narrow and thin ends of the cushions have the previously noted support blocks attached to the bottom at the cushion ends so that the top surfaces of such cushions are level with the adjoining wider and tapered cushions, which are hinged along their bottom edges to the narrow and thinner cushions so that the support blocks also carry the tapered cushions. Narrow support strips 89 fixed to the body side walls and panels 64, 66 extend around the perimeter and serve to support the thinner side edges of cushions 78 when in certain bed configurations.

Up to now, the facilities located in the intermediate section 22 of the van have only been described in general terms. A more detailed description follows beginning with the kitchen facility 50. As is seen, the kitchen facility is bounded fore and aft by the previously mentioned transversely extending partition walls 60 and 62. The kitchen includes a counter area having a range 120, sink 122 and work surface or counter 124. A refrigerator 126 is located below the counter area in a forward portion of the facility immediately adjacent the forward partition 60. An open space which may be provided with drawers 115 is located below the rearward portion of the counter area. A microwave oven 128 is located in spaced relation above the refrigerator. An exhaust fan 129 is also located over the cooking range. The cabinet door 114 (which covers up the open space when the drawers 115 are not provided) is located below the cooking range 120 rearwardly of the refrigerator door and this cabinet door 114 is hinged to the outward edge of the previously described movable partition panel 64. When unlatched by means of a barrel bolt 130, this cabinet door 114 can be swung outwards for normal access to the space behind it or inwardly from its normal position parallel with the face of the refrigerator into juxtaposition with the partition panel 64 before the latter is advanced forwardly as previously described in order to allow for the double bed to be made up. Other suitable drawers may be located under the forward portion of the kitchen counter work surface and these need not be described further.

Other features which are well known per se in the R.V. art including a heating furnace, a charger/converter, water heater, air conditioner, water and waste tanks, and similar facilities are all provided but need not be described here as they are all well known and form no part of the instant invention.

Turning now to the facilities on the opposing side of the aisle space, the toilet facility 52 is located forwardly of the wardrobe chamber 54. Both facilities are bounded forwardly by the previously noted fixed transversely extending forward partition wall 60 on that side and by the rearward or aft partition 62 of which the previously noted partition panel 66 forms a part when locked in its rearward position.

The toilet facility 52 includes a conventional toilet 140 mounted to the van floor closely adjacent the frontal partition wall 60. The toilet facility is normally closed on the front by a bi-fold door 142 comprising a pair of panels 143, 144 hingedly connected together by a lengthwise extending piano-type hinge 145 with the first panel 144 being connected to the outer edge of the front partition panel 60 by a piano-type hinge 146. When the bi-fold door 142 is extended across the aisle space 56, as illustrated in FIG. 2 or 3, the frontal section 20 of the van is effectively segregated from the intermediate section 22. Suitable latches, hooks, or catches (not shown) are used to retain the bi-fold door 142 in either its closed or in its extended position.

Turning now to the wardrobe chamber 54, it will be seen that the same is provided with the double bi-fold door 110 noted previously and which includes door panels 150, 152, 154 and 156. Double bi-fold door panel 152 is hinged to the fixed rear partition 62 on the inside. Double bi-fold door panel 150 is hinged to bi-fold door panel 152 along the inside edge for rotation in the direction of arrow A. Double bi-fold door panel 156 is hinged along its upper outside edge 160 to the lower outside edge 162 of double bi-fold door panel 152 above. Double bi-fold door panels 150 and 154 respectively are hinged along their vertical edges to double bi-fold door panels 152 and 156 respectively for rotation in the direction of arrow B. An up and downward disposed flat sliding bar 167 in a pocket 165 (slot) partially recessed in door panels 150 and 154 and partially recessed in the covers on each panel 150 and 154 forming said pocket 165 and held in the raised position by a hook, catch, barrel bolt or wing bolt 169 when panels 154 and 156 are in the raised position and when engaged, keeps door panels 150 and 154 in firm vertical alignment and coplanar position when folding or unfolding. When the door panels 150 and 154 are folded with door panels 152 and 156 and the barrel bolt 164 and sliding bar 167 are disengaged and the doors in the closed position, the door panels 156 and 154 can then be swung together upwardly and retained there by the latch 112 fastened to the upper edge of double bi-fold door panel 154 or by wing bolt 113 as seen for example in FIG. 4. Also, as seen in FIG. 4 a turn latch 117 holds door panel 154 against door panel 156 and keeps it from swinging outwardly when wing bolt 113 only is applied. It can readily be seen that when the bi-fold door 142 which normally covers the toilet facility 52 is extended across the aisle space and that when the double bi-fold door 110 described above is also extended across the aisle space as illustrated in dashed lines in FIG. 2, that there is provided in the central region of the van a relatively large privacy compartment which is extremely useful when using the toilet or when utilizing the shower facility to be described hereinafter.

With further reference to the double bi-fold door 110, it should be noted that the same is provided with a flat retaining bar 170 which retains panels 152, 156 of the double bi-fold wardrobe door in a firm, vertical, coplanar position when the door is extended. This flat bar 170 is pivotally connected to an upper door panel 152 by means of a screw 171 and is provided with notches shaped such that projecting headed screws 172, 174 in certain of the lower panels enter into and engage with these notches thus holding the panels in the desired coplanar relationship.

With reference again to the wardrobe chamber 54, it will be noted that the same has a longitudinally extended hangar bar 180 disposed just below the horizontally extending overhead shelf 182. FIG. 2 shows a multiplicity of garments on hangers suspended in generally vertically disposed array within the wardrobe chamber 54 when the previously described partition panel 66 and partition panel extension 105 are in their rearward positions flush with the fixed rear partition 62. However, when partition panel 66 and the structures associated therewith are advanced forwardly as illustrated in FIGS. 3 and 5, the lower portions of the garments are displaced forwardly to positions generally over and above the toilet 140. The upper portions of the garments which are still effectively within the wardrobe chamber 54 tend to partially rest on the downwardly and forwardly sloping partition panel extension 105 and the further panel extension 109 associated therewith both of which were described previously.

Figure 8:
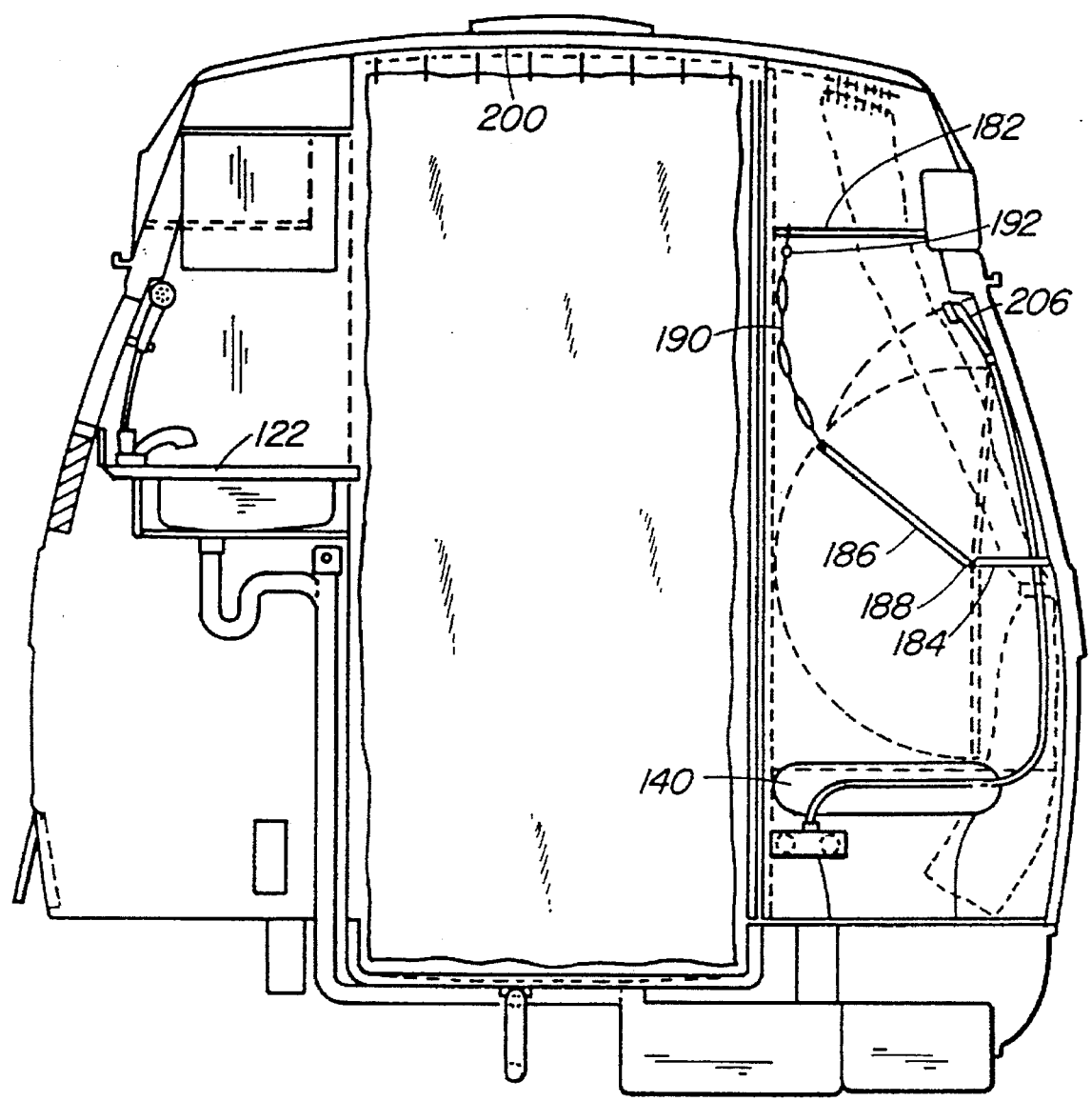
FIG. 8 is a further transverse cross-sectional view of the R.V. taken along line 8—8 of FIG. 5.

As best seen in FIG. 8 a narrow horizontally arranged shelf 184 is fixed to the body side wall 12 behind the toilet 140 at a height as to allow the toilet seat cover to lodge under it when it has been lifted to a vertical position. This narrow shelf 184 has a support panel 186 attached thereto by way of a hinge 188, which support panel 186 is stowed in an upward vertical position adjacent the side wall of the body when not in use. This support panel 186 is placed in a downwardly extending vertical position before the garments are displaced over the toilet by virtue of the action described previously. When the garment lower portions are positioned over the toilet and are hanging in front of the downwardly extending support panel 186, this support panel along with the garments is then swung upwardly around its hinge 188 and is lifted up relatively high and retained in the raised position by chains 190 secured on hooks 192 which are fastened to the shelf 182 above. This lifting of the garments and securing of the same in an upward position allows normal use of the toilet 140 at all times when the dinette and lower portion of the wardrobe chamber have been converted to provide the double bed. The foregoing procedure causes the garments to be moved from a vertically hanging position within the wardrobe chamber to a more or less horizontal position. The procedure tends to make good use of the upper half of the space above the toilet which is practically never used in any event as most persons lean forward when using a toilet.

Turning now to the central aisle space 56 this includes a lowered or dropped-floor portion thereby to allow users to have plenty of head room when standing in the intermediate section 22 and using the facilities there provided. This drop-floor portion is provided with a shallow shower-pan 196 having a drain opening 198. A shower track 200 is supported from the ceiling of the van in a conventional manner, such shower track 200 extending in a generally rectangular outline path above and around that region defined by the shower pan 196 in order that a shower curtain 202 (in phantom in FIG. 1), suspended from the track 200 may be drawn around the track so as to surround a person standing in the shower pan 196. In one version, the shower curtain may be slit (204) on one side from a point near the top down to the level of the kitchen counter in order to reach the hand-held shower head 206 attached to a flexible hose 208 which in turn is connected to the sink faucet (not visible). Once the shower has been completed, the shower curtain 202 is pulled around the track in a counterclockwise direction (as illustrated by the arrows in FIG. 2 for example) and is moved along that terminal section of the track 200 which extends into the upper portion of the toilet facility. It will be seen here that the previously noted overhead shelf 182 as well as the door headers 210 have a gap or space 212 to allow the upper end of the shower curtain 202 to be moved through this gap 212 into the storage position in close juxtaposition to the side wall of the van with the lower portion of the shower curtain hanging downwardly such that it can be secured to the side wall of the van just behind and to one side of the toilet. It might be noted here that in an alternative version, the previously noted need for a slit 204 in the shower curtain to accommodate the hand-held shower head 206 can be avoided if the shower head 206 is provided with a water supply which originates from a point located just to one side of the toilet. The controls 207 are shown on several drawings (e.g. FIG. 5). In this situation, the shower head flexible hose is permanently attached to the water outlet and when the shower head is not in use, it can be secured against the side wall 12, next to the shower curtain, when stowed by suitable clips, as shown in several views.

FIGS. 9–12 show a somewhat modified version particularly applicable to the "short" van body noted previously although the principles of the invention can be applied in longer length (including extended length) bodies as well. There are many similarities with the unit described previously such as with respect to the kitchen facility 50, the rear section 24 with the provision for conversion from a sitting/ dining mode to a sleeping mode with either a single or double bed, and also in the storage or wardrobe facility 54.

With the shorter van body, the previously described lounge seats have been omitted and there are provided only driver and passenger seats 38, 40 respectively. The drop floor in the intermediate section 22 is of somewhat different shape (essentially being shorter) than the one described previously. A notable difference is that the toilet 140 is located in a counter-height cabinet 220 which cabinet is provided with a collapsible double bi-fold door 222 which is shown in the closed position in FIG. 9.

Figure 11:
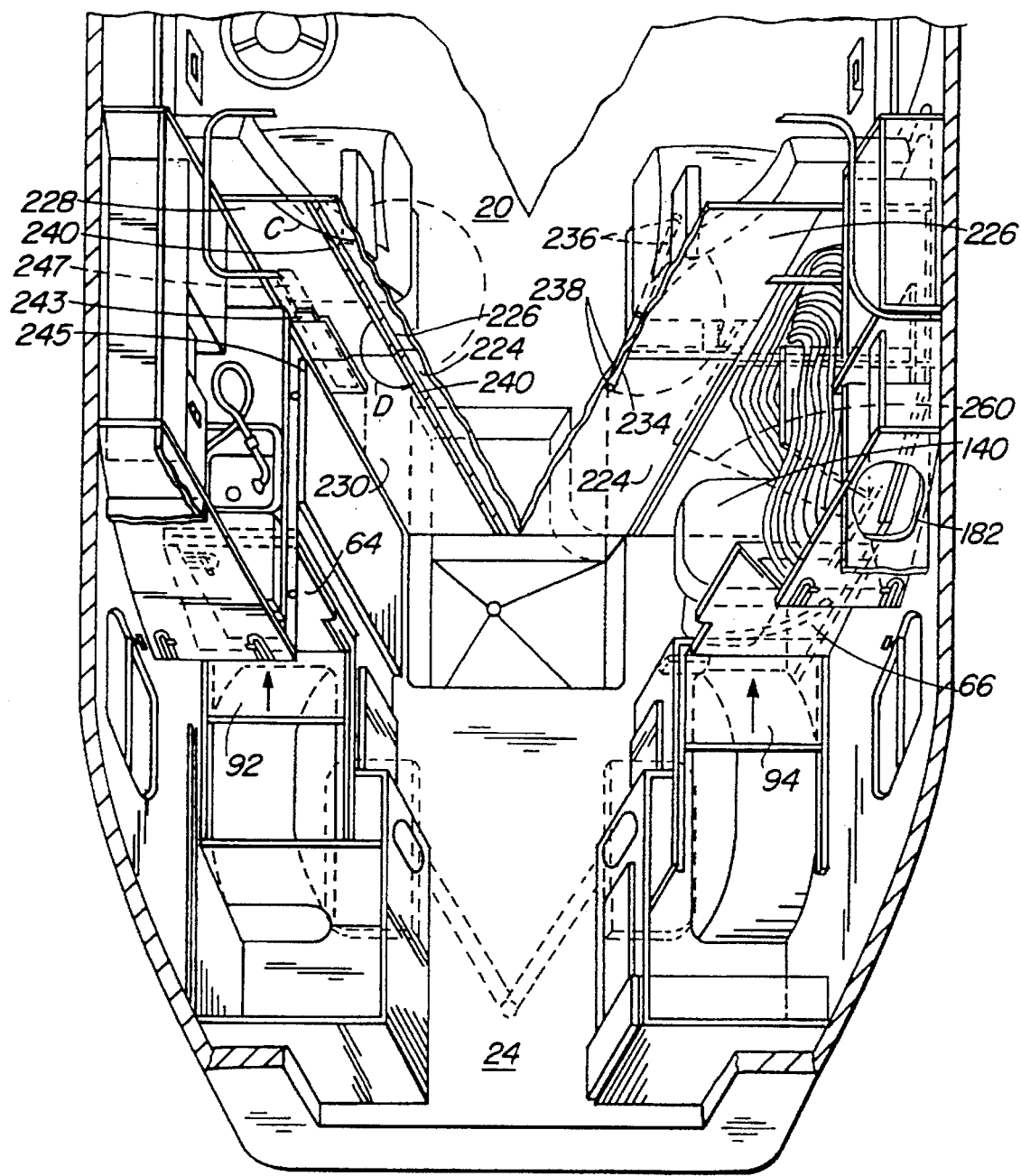
FIG. 11 is a perspective view as in FIG. 9 but with the cushions removed to show the underlying support arrangement and with the double bi-fold door for the toilet facility shown in the extended position across the centre aisle; (Clothing in the wardrobe is also shown as partially extending over into the region above the toilet space.)
Figure 12:
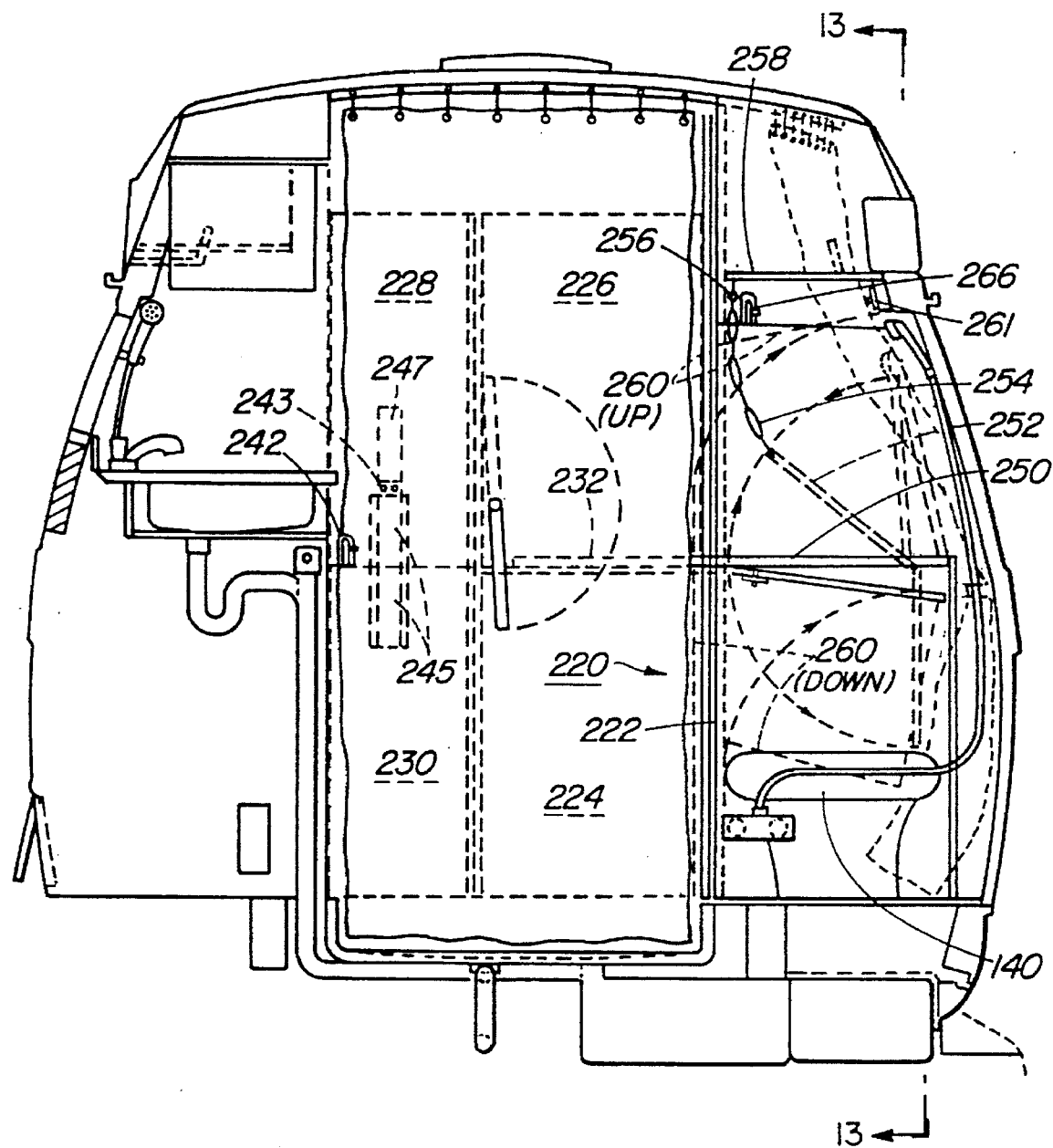
FIG. 12 is a transverse cross-section view taken along line 12—12 of FIG. 13.

With reference to FIGS. 11 and 12, the double bi-fold door 222 for the toilet cabinet is shown in the fully open and extended position across the sunken floor thus forming a privacy shield. The cabinet door 222 comprises rectangular panels 224, 226, 228 and 230 all hinged together by way of piano hinges as will be described more fully hereafter. Upper door panel 226 is hinged at 232 along its outside body edge to the outside upper edge of lower panel 224. A flat metal bar 234 is pivotally connected at one end by a screw to panel 226. This bar is provided with spaced apart notches 236, these notches leading in from the side edge of the bar adjacent one end and in the central area. These notches are shaped so as to hook behind the projecting heads of screws 238. This flat bar 234 is hidden between panels 224, 230 and 226,228 respectively when the double bi-fold cabinet door 222 is in the retracted position and fully closed. Panels 228 and 230 are hinged at 240 on the inside edges of panels 224 and 226 respectively. As described previously in connection with the door panels for the wardrobe chamber, door panels 228 and 230 are maintained in firm vertical alignment by a flat slide bar 247 which cooperates with pockets 245 in each of door panels 228, 230. A wing bolt retains bar 247 in the raised position when not in use. The bar and pockets are partly recessed in the panels to avoid any obstruction. Barrel bolt 242 keeps the toilet cabinet doors in the closed position when all four panels are retracted.

Arrows C and D show the direction of swing of the respective panels. The collapsible wardrobe double bi-fold door 110 is not shown in FIG. 11 in order that the structures holding the garments in the more or less horizontal position as described with the previous embodiment, to enable the toilet 140 to be used, may be seen. The countertop 250 provided on the toilet cabinet 220 along with the pivotally mounted garment support panel 252 (see FIG. 12) can be raised to a more or less vertical position thereby forming a privacy shield in front of the window of the second side cargo door. The garment support panel 252 can be lowered to a downward vertical position before the garments are pushed to positions over the toilet 140 and the previously described partition panel and associated structures are moved forwardly to allow the double bed to be set up as previously described. The support panel 252 is then raised again along with the lower portions of the garments and held up by chains 254 and connected to hooks 256 on the shelf 258 above in essentially the same fashion as described with the previous embodiment.

Figure 9:
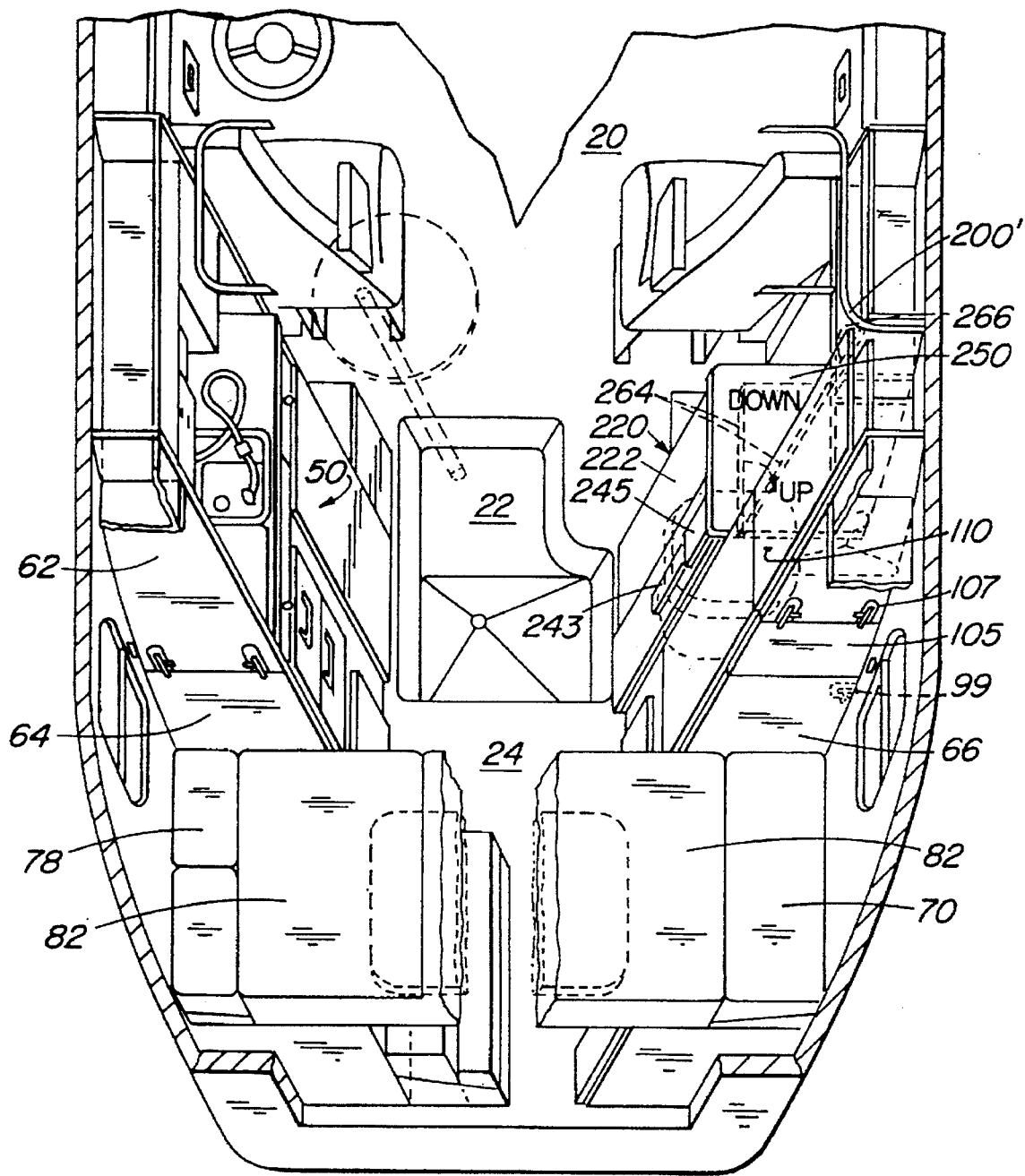
FIG. 9 is a split perspective view looking from above and looking toward and into the interior of a second embodiment of the recreational vehicle employing a "short" van body with a modified toilet facility and with the cushions in the rear section being arranged to form a wide single bed unit or a narrow double bed for children etc.
Figure 10:
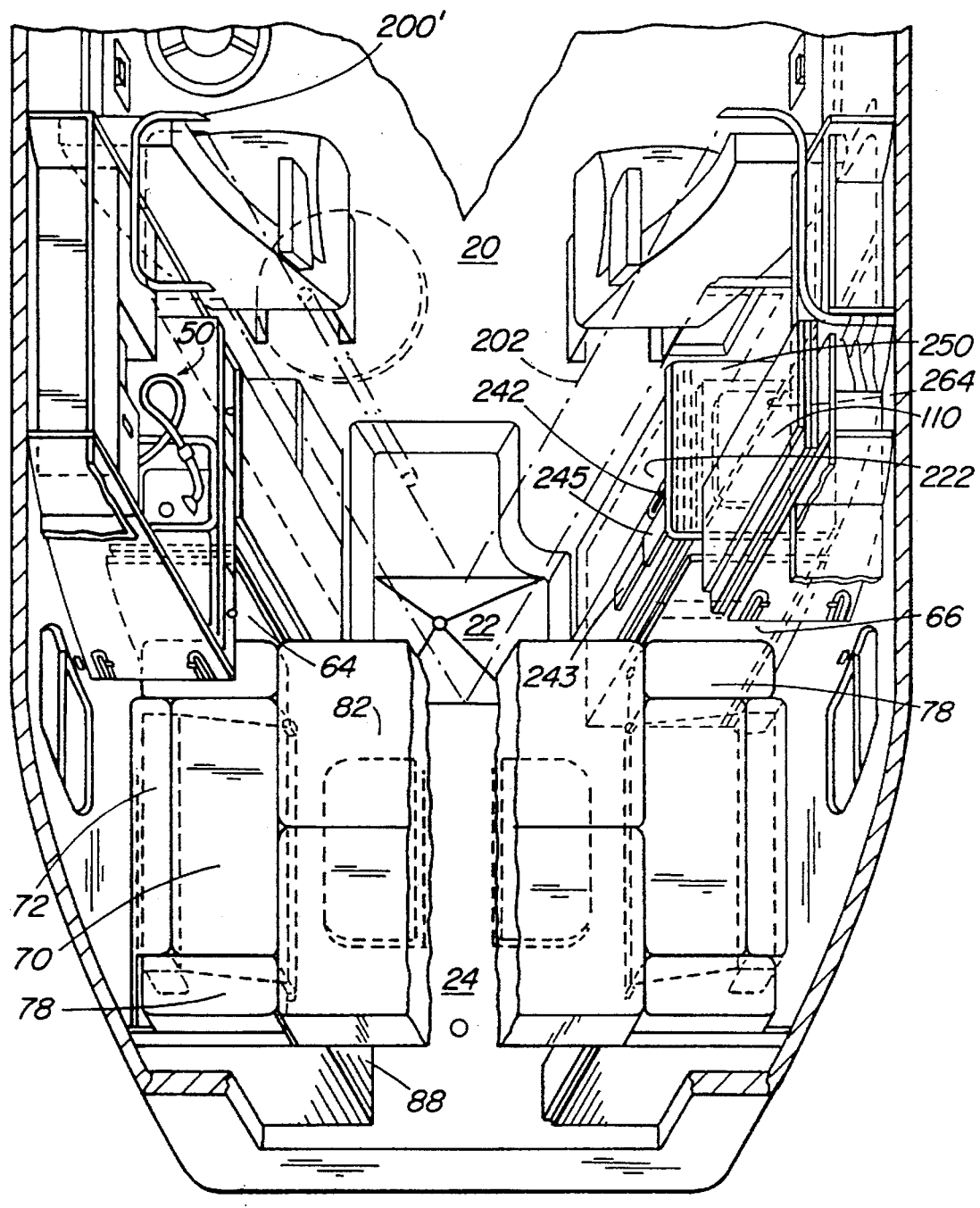
FIG. 10 is a perspective view generally similar to FIG. 9 but with the rear section having been effectively extended in length to accommodate the cushions which have been rearranged to provide a double bed.
Figure 13:
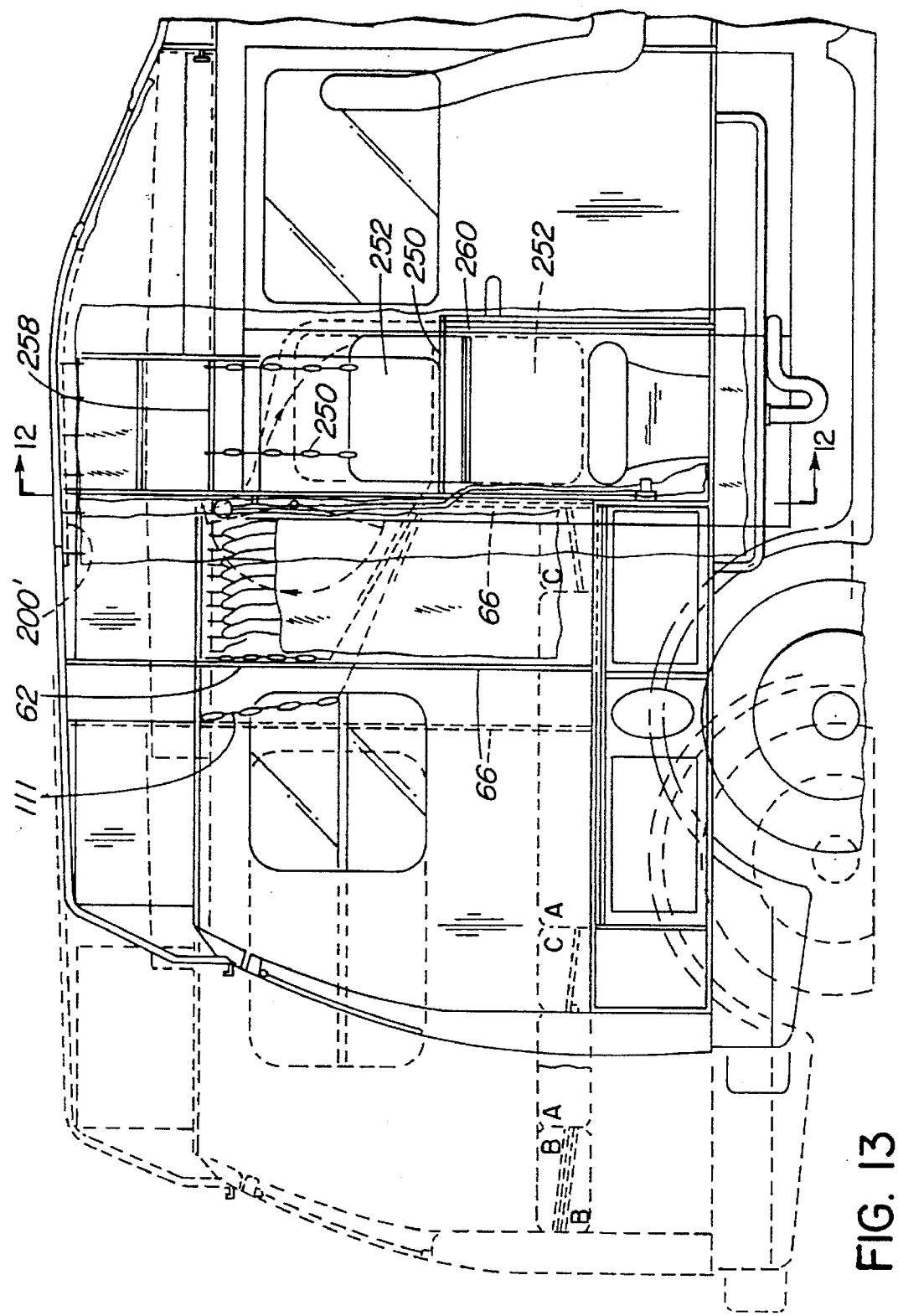
FIG. 13 is a longitudinal section view taken along line 13—13 of FIG. 12 with the short body version of the van shown in full lines and with a loger body version shown in phantom in order to provide a king-size bed, twin beds or wide (for four people) dinette.

A panel 260 firmly fixed to, at or near, the left edge of the toilet cabinet countertop 250 at a right angle thereto and pointing downwardly when the countertop is horizontal, is swung up to form a vertically extending privacy shield when the countertop 250 is in the raised position as in FIG. 11 and is held in place by a barrel bolt or latch 261. On the right edge of the countertop 250 as can be readily seen in FIGS. 9 and 10, is a hinged partition panel 264 held in an upward vertical position when the toilet is not in use by a barrel bolt 266. This partition panel 264 is lowered into a horizontal position onto countertop 250 before this countertop is raised to a more or less vertical position in order to provide space for the garments which are subsequently pushed into a position generally over the toilet 140 as seen in FIGS. 11 and 13.

Referring back to FIG. 9, the rear section 24 has been shown converted to a large single bed (or narrow double bed as noted previously), in which event the conversion of space by forward movement of partition panels 64, 66 etc. is not required. These partition panels therefore remain in the rearward positions and are only advanced forwardly in the event a normal double width bed is wanted for the night. Since the single bed does not require all of the cushions for the sitting units of the dinette, the extra cushions are stored beneath the bed. The full double bed size unit is shown as being made up in FIG. 10 and it will be seen here that the layout and arrangement of cushions etc. is exactly as described previously. The partition panels 64,66 have been moved to the forwardly advanced positions and the double bi-fold door 110 on the wardrobe chamber has been moved to its fully collapsed position, i.e. with its lower portion swung upwardly and latched into juxtaposition with the upper portion to allow space for the double bed. The shower curtain 202 is shown extended in dashed lines and retracted in solid lines (only the portion above the wardrobe shelf). The shower curtain track 200' is somewhat differently arranged from that described in the first embodiment. The track itself is in a generally rectangular layout. A terminal end portion of the track 200 extends through a gap 270 provided in the door headings and in the horizontal overhead shelf 182. Thus, the shower curtain in this embodiment is effectively stored in the wardrobe compartment when not in use.

Although several modifications and variations have been described by way of example, those skilled in this art will understand that the invention is not to be limited to the embodiments which have been described by way of example but that the invention is to extend to the full range of equivalencies as encompassed by the appended claims.

What is claimed is:

1. A recreational vehicle in the form of a camper van and including a body defining opposed side walls and a floor, the body having a plurality of serially arranged lengthwise extending sections including a frontal section for a driver and at least one passenger; an intermediate section including at least toilet and kitchen facilities and a lengthwise extending aisle space separating said kitchen end toilet facilities; end a rear section having sleeping facilities therein; and wherein the body floor, in said aisle space in the intermediate section, includes a dropped floor section serving as a shower pan having a drain opening thereby to enable a shower stall to be temporarily established in said aisle space for stand-up use by a person.

2. The recreational vehicle of claim 1 including a track extending above the shower pan for supporting a shower curtain such as to surround a person standing in the shower pan.

3. The recreational vehicle of claim 2 wherein said intermediate section includes a chamber, and wherein said track enters into said chamber for storage of a shower curtain therein when not in use.

4. The recreational vehicle of claim 1 wherein said shower pan is closely adjacent said kitchen facility, the latter having a sink and water supply means for a shower head.

5. The recreational vehicle of claim 1 wherein said intermediate section has foldable doors associated therewith movable into positions extending transversely of the vehicle body thereby to segregate the intermediate section from said frontal and rear sections and to provide a central privacy area in said intermediate section.

\* \* \* \* \*